July 9, 1929.　　　J. C. RAINEY　　　1,719,999
SWITCH
Filed March 26, 1926　　2 Sheets-Sheet 1
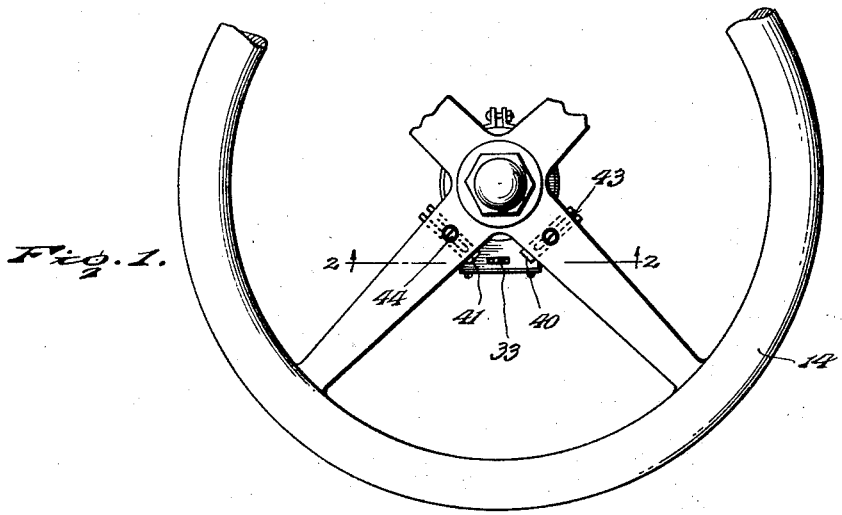
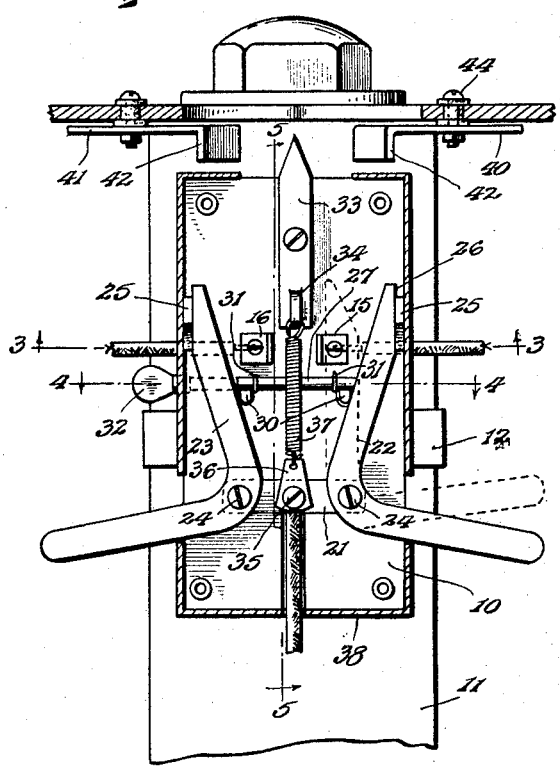
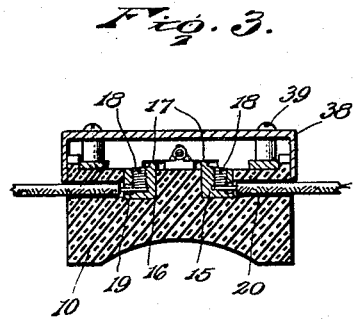
Inventor
J. C. Rainey.
By
Lacey & Lacey,　　Attorneys July 9, 1929.　　　J. C. RAINEY　　　1,719,999
SWITCH
Filed March 26, 1926　　　2 Sheets-Sheet 2
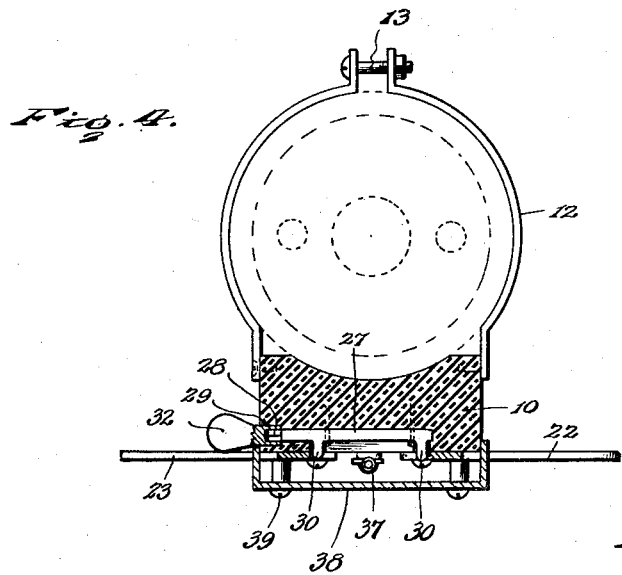
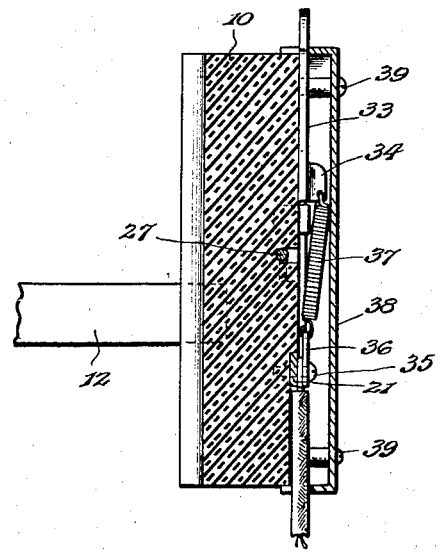
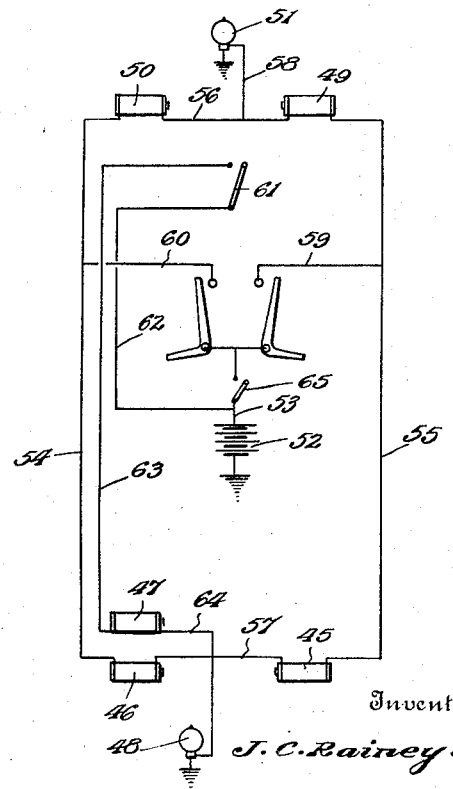
Inventor
J. C. Rainey.
By
Lacey & Lacey, Attorneys Patented July 9, 1929

1,719,999

UNITED STATES PATENT OFFICE.

JAMES CLYDE RAINEY, OF GROVE CITY, PENNSYLVANIA.

SWITCH.

Application filed March 26, 1926. Serial No. 97,746.

This invention relates to an improved switch of the general character disclosed in my co-pending application for traffic signal, filed January 21, 1925, Serial No. 3852, and seeks, among other objects, to provide a switch peculiarly adapted for controlling the electrically operated signaling devices of the prior invention.

The invention seeks, as a further object, to provide a switch which may be mounted upon the steering post of a motor vehicle adjacent the steering wheel for manual operation to close a desired circuit, and wherein means will be provided upon the steering wheel for automatically opening the switch as the vehicle is guided into a straight path after making a turn.

And the invention seeks, as a still further object, to provide a switch embodying a pair of switch levers selectively movable manually to closed position, and wherein means will be provided for locking both levers against movement and preventing the undesired closing of either lever.

Other objects of the invention not specifically mentioned in the foregoing will appear during the course of the following description.

In the accompanying drawings:

Figure 1 is a plan view showing my improved switch in connection with a conventional steering post and steering wheel of a motor vehicle.

Figure 2 is a vertical sectional view through the switch on the line 2—2 of Figure 1, looking in the direction indicated by the arrows.

Figure 3 is a transverse sectional view on the line 3—3 of Figure 2, looking in the direction indicated by the arrows.

Figure 4 is a transverse sectional view on the line 4—4 of Figure 2, looking in the direction indicated by the arrows.

Figure 5 is a detail vertical sectional view on the line 5—5 of Figure 2, looking in the direction indicated by the arrows.

Figure 6 is a diagrammatic view showing the switch in connection with the circuits of a pair of signaling devices, as illustrated in my above identified prior application.

In carrying the invention into effect, I employ a body block 10 of suitable insulating material and, as shown, the block is grooved at the rear side thereof so that the block may seat flat against a vehicle steering post, conventionally illustrated at 11. Fixed to the side faces of the block to embrace the steering post are straps 12, and connecting the free ends of said straps is a bolt 13 which may be adjusted for tightly binding the block in place. In conjunction with the steering post I have illustrated a conventional steering wheel 14.

Embedded in the body block 10, as seen in Figure 3, are spaced terminals 15 and 16 having inclined upper faces, and formed on said terminals at the summits of said faces are upstanding stop lugs 17. The terminals are bored to accommodate clamping screws 18 and formed in said terminals near the lower ends thereof are lateral openings 19 registering with lateral openings 20 in the block. Thus, as shown, circuit wires may be inserted in the openings 20 to project at their adjacent ends through the openings 19 of the terminals beneath the clamping screws 18 and be secured by said screws. Countersunk in the upper face of the block below the terminals 15 and 16 is a transversely disposed conductor strip 21, and pivoted upon the ends of said strip are angle-shaped switch levers 22 and 23 secured to the strip by pins 24 screwed into the strip. The inner ends of these levers are movable across the inclined faces of the terminals 15 and 16 to coact therewith while the outer ends of the levers project laterally beyond the side edges of the body block so that the outer ends of the levers may be readily grasped for swinging the levers to closed position. The stop lugs 17 of said terminals will, of course, limit the closing movement and by forming the terminals with inclined upper faces, the levers will be caused to bind against said terminals for establishing efficient electrical contact therewith. Rising from the upper face of the body block at the side edges thereof are stops 25 which are preferably integral with said block, and formed on the inner ends of the levers at their outer edges are angularly disposed faces 26 to seat flat against said stops for limiting the opening movement of the levers.

Countersunk in a suitable recess in the upper face of the block is a locking shaft 27, one end of which extends through a bore in the block and is provided with a triangular terminal 28 lying within a recess 29 in the adjacent side edge of the block. As shown in Figure 2, the shaft lies close below the terminals 15 and 16 and projecting from the shaft are spaced stop lugs 30. Extending over the shaft at the inner confronting edges of said lugs are staples 31 or other suitable fastening devices embedded in the block for securing the shaft in position as well as journaling said shaft. Shaped to fit at its inner end in the recess 29 of the block is a key 32 having a socket to accommodate the triangular terminal 29 of the shaft and, as shown in Figure 1, this key may be turned for rotating the shaft and swinging the lugs 30 upwardly between the inner ends of the levers 22 and 23, when said levers will be locked by said lugs against movement. Accordingly, by withdrawing the key 32, unauthorized parties may be prevented from swinging the levers and closing the switch.

Pivoted at a point between its ends upon the upper end portion of the body block is a double-ended trip member 33, the outer end of which projects beyond the upper end of the block while the inner end of said member projects between the inner ends of the levers 22 and 23, and upstanding from the inner end of said trip member is a lug 34. Engaged through the conductor strip 21 is an anchoring screw 35, the inner end of which is sunk into the body block, and mounted on said screw is an insulating tab 36. Extending between said tab and the lug 34 of the trip member 33 is a spring 37 normally holding the trip member in vertical position. As shown in Figures 2 and 5, the upper face of the body block is grooved to accommodate a feed wire which is clamped by the screw 35 between the tab 36 and the strip 21 so that said screw also provides a terminal for said wire electrically connecting the wire with the conductor strip and with the switch levers 22 and 23. Fitting over the body block is a cover 38 secured to the said block by screws or other fastening devices 39. As shown in Figure 2, the cover is notched to freely accommodate the outer ends of the levers 22 and 23 and is further provided at the upper end thereof with a notch to freely accommodate the projecting end of the trip member 33.

Mounted upon adjacent spokes of the steering wheel 14 are plates 40 and 41 which are suitably insulated from said spokes and are provided with downturned ends 42 to engage the outer end of the trip member 33. These plates are formed with slots 43, and extending through said slots and through said spokes of the steering wheel are bolts 44 securing the plates in position. As will be appreciated, the plates may be adjusted longitudinally upon the spokes.

In Figure 6 of the drawings, I have diagrammatically shown the manner in which the switch is electrically connected with the actuating magnets and signal lights of a pair of signalling devices as disclosed in my prior application previously identified. In accordance with the invention of the prior application, a rear signal is employed which embodies electro-magnets 45, 46, and 47 for operating certain signal arms, and the rear signal also includes a signal light 48. A front signal is also provided which includes electro-magnets 49 and 50 for operating a signal arm, and also includes a signal lamp 51. A battery or other suitable source of electrical energy is indicated at 52. One side of the battery is grounded and leading from the other side of the battery to the terminal 35 of the switch is a wire 53. Connecting the magnets 45, 46, 49 and 50 in series are wires 54, 55, 56 and 57, and leading from the wire 56 to the lamp 51 is a wire 58. One side of the lamp is grounded so that the wire 58 thus forms a ground connection through the lamp for the magnets 49 and 50. Connecting the terminals 15 and 16 of the switch with the wires 54 and 55 are wires 59 and 60. An auxiliary switch is indicated at 61. This switch is used in conjunction with the brake pedal of the vehicle, being movable to closed position by said pedal when shifted to apply the brakes, and connecting one terminal of the switch with the wire 53 is a wire 62, while a wire 63 extends from the other terminal of the switch to the magnet 47. Leading from the magnet is a wire 64 connecting the magnet in series with the lamp 48. The wire 64 is also connected with the wire 57 so that the wire 64 thus forms a ground connection through the lamp for the magnets 45 and 46.

Assuming now that the driver intends to make a right hand turn, the switch lever 22 is swung to engage the terminal 15 when, as will be appreciated in view of the foregoing, a circuit will be closed through the magnet 45 of the rear signal as well as through the magnet 49 of the front signal and through the lamps 48 and 51. The magnets and said lamps will accordingly be energized for accomplishing the display of the desired signal at the front and rear of the vehicle. However, as the turning of the vehicle is completed and the steering wheel 14 is rotated to again direct the vehicle in a straight path, the downturned end of the plate 40 upon the steering wheel will be moved to engage the outer end of the trip member 33, when said trip member will be rocked to engage the inner end of the switch lever 22 and kick said lever out of contact with the terminal 15. The switch will thus be automatically operated for breaking the circuit therethrough. In like manner, when it is intended to make a left hand turn, the switch lever 23 is manually swung to engage the terminal 16, when a circuit will be closed through the magnets 46 and 50 and through the lamps 48 and 51. The magnets will accordingly be energized for accomplishing the display of the desired left turn signals at the front and rear of the vehicle. However, as the vehicle is righted upon completion of the turn, the downturned end of the plate 41 upon the steering wheel will strike the trip member 33 so that said member will be rocked to kick the switch lever 23 to open position. The switch will, therefore, as in the previous instance, be automatically operated for breaking the circuit therethrough. The switch 61 is provided to control the magnet 47 alone for accomplishing the display of a stop signal when the brakes are applied. Closing of the switch 61 will, of course, close the circuit through said magnet for energizing said magnet as well as energizing the lamp 48. If desired, the vehicle ignition switch, conventionally indicated at 65, may be arranged to control the circuit of the wire 53 so that when the ignition circuit is broken, flow of current to the switch levers 22 and 23 will be cut off.

Having thus described the invention, what I claim is:

1. A switch including a body block, spaced terminals carried thereby, levers pivoted upon the block and movable to closed position engaging said terminals respectively, a pivoted spring-returned trip member engageable at its outer end for swinging the inner end of said member to selectively kick said levers to open position, and means for locking the levers in open position.

2. A switch including a body block, spaced terminals carried thereby, levers pivoted upon the block and movable to closed position engaging said terminals respectively, a pivoted spring-returned trip member engageable at its outer end for swinging the inner end of said member to selectively kick said levers to open position, and a shaft rotatably mounted upon the body block and provided with lugs movable between said levers for locking the levers in open position.

3. A switch including a block of insulation, spaced stationary terminals carried thereby, angle levers pivoted upon the block and each having one end arranged adjacent one of the terminals to ride onto the same and close a circuit therethrough and its opposite end projecting laterally beyond the block for manual manipulation, a trip member pivoted at a fixed point between its ends upon the block and projecting at its inner end between the terminal engaging ends of said levers, and a tension spring connected to the inner end of said trip member and to the block and normally alined with said member for holding the trip member centered with respect to said terminals, the outer end of the trip member being accessible whereby said member may be rocked to impinge against and kick the inner end of either lever out of engagement with its coacting terminal.

In testimony whereof I affix my signature.

JAMES CLYDE RAINEY.